July 7, 1964
A. H. BRANDON
3,139,686
TUBING TESTER WITH RATCHET CONTACTS
Filed Sept. 7, 1962
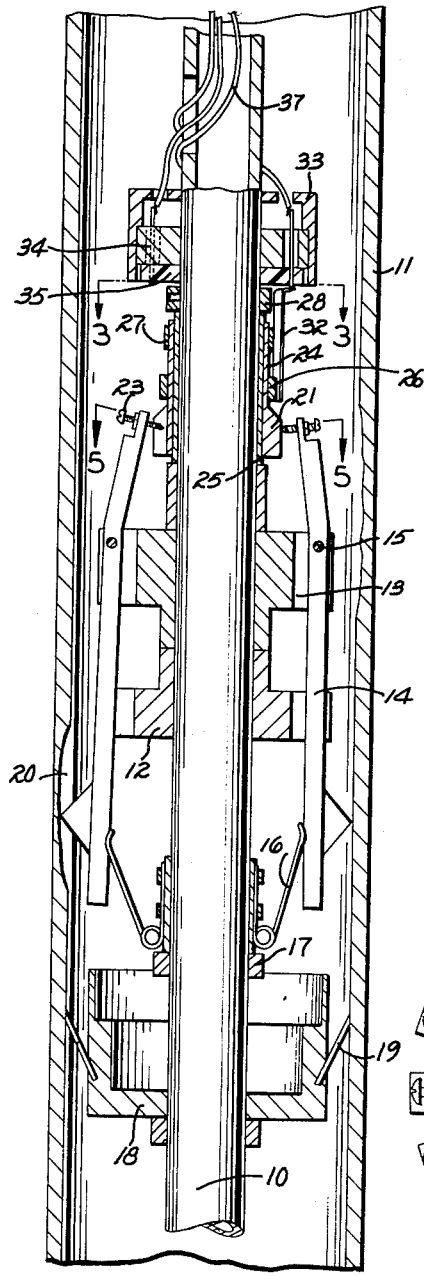
FIG. 1
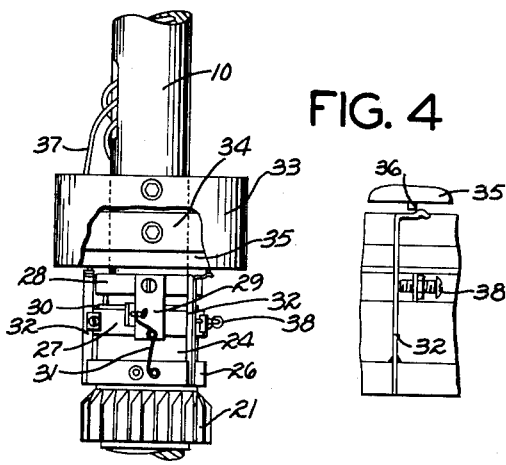
FIG. 2
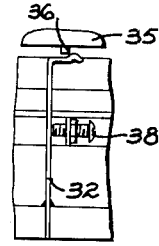
FIG. 3
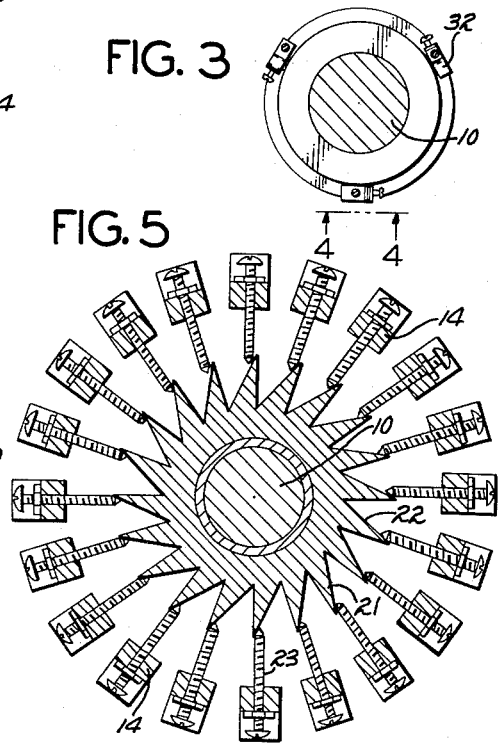
FIG. 5
INVENTOR.
ARTHUR H. BRANDON
BY
ATTORNEY

United States Patent Office 3,139,686
Patented July 7, 1964

3,139,686
TUBING TESTER WITH RATCHET CONTACTS
Arthur H. Brandon, 1450 Ramillo Ave.,
Long Beach, Calif.
Filed Sept. 7, 1962, Ser. No. 222,157
4 Claims. (Cl. 33—178)

This invention relates to a tubing tester with ratchet controlled contacts whereby tubing may be tested in a well to determine if the wall has been eroded or reduced in thickness, and also to determine the depth and position of such possible erosion or wear.

This invention is an improvement in my patents numbered 2,630,632, March 10, 1953; and 2,766,533, October 16, 1956; and a joint Patent No. 2,990,621, July 4, 1961.

A prime object of my invention is to provide a tubing tester which may be introduced into a pipe or tubing within the well, and which will indicate electrically at a remote point not only the degree to which the tube or pipe may have become internally worn, but also the angular position of that worn area within the pipe.

Another object of this invention is to provide a tubing tester wherein a plurality of radially extensible fingers are provided, the fingers being engageable with the interior of the pipe or tube, and which are urged outwardly by spring means and to cause the outwardly pressed finger to actuate a ratchet which, in turn, rotates into a position to contact an electrical terminal to signal and indicate at a remote point the fact that the tube has become internally worn or eroded.

Still another object is to provide a novel tubing tester in which a ratchet structure is actuated by any one of the radially extensible fingers to partially rotate the ratchet. The partial rotation of the ratchet being electrically indicated by electrical contacts which indicate such contact at a remote point.

Other objects, advantages and features of invention may appear from the accompanying drawing, the subjoined detailed description and the appended claims.

In the drawing:

FIGURE 1 is a fragmentary longitudinal sectional view of the tubing tester.

FIGURE 2 is a fragmentary side elevation of the ratchet assembly and contacts with the extensible fingers removed.

FIGURE 3 is a transverse sectional view taken on line 3—3 of FIGURE 1.

FIGURE 4 is a fragmentary side elevation taken from line 4—4 of FIGURE 3.

FIGURE 5 is an enlarged sectional view taken on line 5—5 of FIGURE 1.

Referring more particularly to the drawing, and especially FIGURE 1, which is an illustration of a tubing tester as shown in the patent issued to A. H. Brandon, No. 2,766,533, October 16, 1956, and comprises a central mandrel 10 which is hollow from a point adjacent the upper end of the testing structure mounted thereon for the purpose of permitting conducting wires to be placed therein and threaded through the mandrel to the surface of the well, or to some other remote point. The centering devices which are used in a tool of this character are not shown, since they are usual and well known in the art, and are adequately shown in applicant's prior patent mentioned above, as well as his Patent No. 2,630,-632. The centering device holds the mandrel 10 centrally within the pipe or tubing 11 which is to be tested. Adjacent the lower end of the mandrel 10 I provide a spool 12 which is fixedly mounted on the mandrel so that it will not move vertically nor rotate thereon. The spool 12 is provided with a plurality of peripheral vertically extending slots 13, in each of which a finger 14 is mounted on a pivot 15. The fingers 14 are thus mounted for radial outward and inward movement and are pressed outwardly at their lower ends by means of a spring 16 which are mounted on a collar 17 attached to the mandrel 10. A cup 18 is slidably mounted on the mandrel 10 and has a limited sliding vertical movement, so that in one position of the cup, i.e., its uppermost position, the cup engages the lower ends of all of the fingers 14, thus holding the fingers contracted so that the tool will readily slide downwardly into the pipe or tubing in the well. When the area to be tested has been reached the tool is pulled upwardly and spring fingers 19 on the cup 18 engage the inside of the tubing 11, thus causing the cup to slide downwardly relative to the mandrel 10 to thus simultaneously release all of the fingers 14, and the lower ends of the fingers will then be pressed outwardly against the inside of the pipe or tubing by the respective spring 16 engaging each of the fingers. By moving the tool vertically within the pipe or tubing 11, if the inside of the pipe is worn or eroded as shown at 20, one of the fingers 14 will be forced into this worn or eroded area causing the particular finger to swing outwardly or radially at its lower end under the urging of the spring 16. This causes the finger 14 to swing around the pivot 15, and the upper end of the finger will be moved inwardly an amount determined by the depth of the worn or eroded area 20.

A ratchet contactor structure is mounted above the spool 12 and consists of radially extending teeth 21 equal in number to the fingers 14. Each tooth is provided with an inclined or cam face 22 which is engaged by a threaded screw 23 extending through each of the fingers 14 at the upper ends thereof. Each of the screws, therefore, engages one of the cam surfaces 22, and inward movement of the screw 23 by the swinging action of the finger 14 will cam or ratchet fingers 21 and partially rotate the same for the purpose of making an electrical contact, as will be subsequently described. The ratchet fingers 21 also include a sleeve 24 which rotates on a sleeve 25 surrounding the mandrel 10. The sleeve 25 can be formed of a material which reduces friction and, therefore, permits the ratchet teeth 21 to be cammed by even a slight movement of the fingers 14. A pair of rings 26 and 27 are fixedly attached to the sleeve portion 24 of the teeth 21. A third ring 28 is nonrotatably and fixedly attached to the mandrel 10. The ring 28 has a depending finger 29 which acts as a stop for the shoulder 30 in one direction of movement of the rings 26–27 relative to the ring 28. A spring 31 yieldably presses the stop 30 against the finger 29 so that the rings 26, 27 and 28 are normally held in one aligned position by the spring 31, unless they are rotated relative to each other by the action of the screws 23 against the cam surface 22. Thus a contact finger 14 can displace the rings 26, 27 relative to the ring 28 to form a contact, as will be subsequently described; but when the tool is moved to another position the parts will return to an aligned position of the rings 26, 27 and 28, which permits noncontacting of the electrical contacts and indicating a normal thickness of the pipe or tubing wall.

Three or more contact bars 32 extend vertically above the rings 26–27 and are attached thereto. Positioned immediately above the ring 28 I provide an inverted cup 33 which is fixedly attached to the mandrel 10. The cup 33 carries a disk 34 therein which is also fixedly secured to the mandrel 10. A disk 35, formed of insulating material, is secured to the disk 34 and this disk carries three electrical contacts 36. These contacts are not equally spaced circumferentially, but are spaced at slightly different angles so that varying degrees of movement of the fingers 14 will cause different contacts to be engaged, due to the greater or lesser amount of ratcheting or rotation of the teeth 21 due to different radial movements of the lower ends of the fingers 14. An electrical wire 37 extends from each of the contacts 36 and is conducted up through the hollow portion of the mandrel 10 to the surface of the well, or to some other remote point. At this remote point an appropriate indicator will show the particular contact 36 which has been engaged by a contact bar 32, and thus indicating the amount of erosion or wear, or the depth of the eroded area in the pipe or tubing.

In Operation

The mandrel 10 is lowered into the pipe or tubing to the area where erosion or wear is suspected. The mandrel 10 is now pulled upwardly a short distance, which causes the spring fingers 19 of the cup 18 to drag that cup downwardly on the mandrel 10, to release the lower ends of the fingers 14 and permitting all of the fingers to be pressed outwardly by the spring 16 to drag against the inner surface of the pipe or tubing 11. The mandrel 10 can now be moved upwardly or downwardly slowly, and if an eroded area 20 is passed one of the fingers 14 will drop into this eroded area, causing the upper end of the finger to swing inwardly. The screw 23 on the upper end of the finger will now be pushed radially inwardly against the cam surface 22 of one of the teeth 21. This causes the ratchet teeth and its assembly to partially rotate on the mandrel 10. This rotation is against the tension of the spring 31. One of the contact bars 32 will now engage one of the contacts 36, which will send an electrical signal through a wire 37 to the surface to indicate the position and depth of the eroded or worn area in the pipe. The bars 32 can each be accurately adjusted relative to a contact 36 by means of an adjusting screw 38 which engages each of the bars.

Having described my invention, I claim:

1. A tubing tester comprising a vertically extending mandrel, a plurality of fingers, means pivotally mounting the fingers on the mandrel for outward swinging movement,
    spring means urging each finger outwardly independently of each other,
    ratchet means mounted on said mandrel for partial rotation thereon,
    a plurality of contact bars on said ratchet means,
    and a plurality of contacts mounted on said mandrel adjacent said contact bars for engagement by the contact bars,
    one end of said fingers engaging said ratchet means to partially rotate the ratchet means on swinging movement of a finger.

2. A tubing tester comprising a vertically extending mandrel, a plurality of fingers, means pivotally mounting the fingers on the mandrel for outward swinging movement,
    spring means urging each finger outwardly independently of each other,
    ratchet means mounted on the mandrel for partial rotation thereon,
    a plurality of teeth on said ratchet means,
    one end of each of said fingers engaging a tooth on the ratchet means to partially rotate the ratchet means on swinging movement of a finger,
    a plurality of contact bars on said ratchet means and a plurality of contacts mounted on the mandrel adjacent the ratchet means for engagement by the contact bars.

3. A tubing tester comprising a vertically extending mandrel, a plurality of fingers, means pivotally mounting the fingers on the mandrel for outward swinging movement,
    spring means urging each finger outwardly independently of each other,
    ratchet means mounted on the mandrel for partial rotation thereon,
    a plurality of teeth on said ratchet means,
    one end of each of said fingers engaging a tooth on the ratchet means to partially rotate the ratchet means on swinging movement of a finger,
    a stop on the ratchet means limiting rotation of the ratchet means in one direction, and a spring engaging the ratchet means urging rotation of the ratchet means in direction of the stop,
    a plurality of contact bars on said ratchet means and a plurality of contacts mounted on the mandrel adjacent the ratchet means for engagement by the contact bars.

4. A tubing tester comprising a vertically extending mandrel, a plurality of fingers, means pivotally mounting the fingers on the mandrel for outward swinging movement,
    spring means urging each finger outwardly independently of each other,
    a ratchet ring mounted on the mandrel for partial rotation thereon,
    said ratchet ring being positioned adjacent the upper ends of said fingers,
    said ratchet ring including a plurality of radial teeth engageable by the upper ends of said fingers on swinging movement of the fingers,
    a plurality of contact bars on said ratchet ring,
    and a plurality of contacts mounted on said mandrel and positioned adjacent the ratchet ring,
    said contacts being engageable by the contact bars.

No references cited.